United States Patent Office 3,414,528
Patented Dec. 3, 1968

3,414,528
BLOWN SPONGE RUBBER
Warren S. Hall, Bartlesville, Okla., assignor to Phillips Petroleum Company, a corporation of Delaware
No Drawing. Filed Apr. 9, 1965, Ser. No. 447,092
14 Claims. (Cl. 260—2.5)

ABSTRACT OF THE DISCLOSURE

Rubber sponge, having improved physical properties, is produced by compounding a polymer that contains carbon-tin bonds with a blowing agent and thereafter causing the blowing agent to foam the resulting composition.

This invention relates to improved sponge rubber. In one aspect this invention relates to a process for making blown sponge rubber from polymers of conjugated dienes containing carbon-tin bonds and to the blown spong rubber thus produced. In another of its aspects, it relates to a process for making blown sponge rubber from copolymers that have been stortstopped with a tin containing compound and to the blown sponge rubber thus produced.

In recent years, there has been a marked increase in the demand for blown sponge rubber. Sponge rubber can be used for many purposes. Vast amounts of sponge rubber are used as a cushioning material in furniture, pillows, automobiles, and the like. Sponge rubber is also used as a cushioning material for carpet underlay. In all of its uses, it is important that the sponge rubber remains soft and spongy over a long period of time. One of the main problems with conventional sponge rubber is its tendency to become compressed or matted down with normal wear. Conventional sponge rubber also has a tendency to become compressed or matted down when it is subjected to a load. An important property for sponge rubber is deflection under load. The sponge rubber must be able to support a certain amount of load before it is fully compressed. Sponge rubber products may by prior art methods have been found to be mediocre in their physical properties because of their high compression set values and high deflection under load values.

I have discovered a new method of making blown sponge rubber wherein the sponge rubber product has improved compression set and deflection under load properties. Broadly speaking, my invention comprises the use of a particular type of conjugated diene copolymer to make the blown sponge rubber. I have found, quite unexpectedly, that superior sponge rubber products can be made by using conjugated diene copolymers that contain carbon-tin bonds.

It is an object of this invention to produce a blown sponge rubber having improved physical properties. It is also an object of this invention to provide a process for producing sponge rubber having improved physical properties. Another object of this invention is to provide a process for making sponge rubber having improved compression set and deflection under load properties. It is a further object of this invention to provide a blown sponge rubber product having improved compression set and deflection under load properties.

Other aspects, objects and advantages of this invention will be apparent to those skilled in the art upon reading the specification and the appended claims.

According to this invention, sponge rubber products having improved properties can be made from solution polymerized polymers of conjugated dienes that contain carbon-tin bonds in the polymer structure. The polymers that can be used in the process of this invention are solution polymerized polymers of conjugated dienes. The polymers may be homopolymers of copolymers of conjugated dienes or they may be copolymers of conjugated dienes and vinyl substituted aromatic compounds. More specifically, the conjugated dienes contain from 4 to 12 carbon atoms per molecule, and preferably contain from 4 to 8 carbon atoms per molecule. Mixtures of polymers containing carbon-tin bonds can also be used.

As stated above, my invention utilizes polymers of conjugated dienes that contain carbon-tin bonds for making blown sponge rubber having superior properties. Any method known in the art can be utilized to introduce the carbon-tin bonds into the polymer structure. One convenient method is to shortstop an organoalkali metal catalyzed polymerization with a tin containing compound as described hereinafter.

Examples of the conjugated diene monomers that can be used in making the polymers used in my invention are: 1,3-butadiene, isoprene, piperylene, 2,3-dimethyl-1,3-butadiene, 1,3-octadiene, 4,5-diethyl-1,3-octadiene, and the like.

Examples of the vinyl substituted aromatic compounds that can be used to produce the copolymers used in my invention are: styrene, 3-methylstyrene, 3,5-diethylstyrene, 4-n-propylstyrene, 2,4,6-trimethylstyrene, 3-methyl-5-n-hexylstyrene, 2,3,4,5-tetramethylstyrene, 4-dodecylstyrene, 4-cyclohexylstyrene, 4-phenylstyrene, 4-p-tolylstyrene, and the like. The conjugated dienes can also be copolymerized with other monovinyl containing monomers such as: 1-vinylnaphthalene, 2-vinylnaphthalene, 4-methyl-1-vinylnaphthalene, 3-ethyl-2-vinylnaphthalene, 4,5-dimethyl-1-vinylnaphthalene, 4,5-diethyl-2-vinylnaphthalene, 6-isopropyl-1-vinylnaphthalene, 2,4-diisopropyl-1-vinylnaphthalene, 4-n-propyl-5-n-butyl-2-vinylnaphthalene, and the like. It is preferred that the coyolymer contain not more than 50 weight percent of the vinyl aromatic compound.

The polymers of the above-listed compounds are prepared by contacting the monomer or monomers which it is desired to polymerize with an organoalkali metal compound, including mono and polyalkali metal compounds in the presence of a hydrocarbon diluent. The organoalkali metal compounds preferably contain from 1 to 4 alkali metal atoms per molecule. While organometallic compounds of any of the alkali metals can be employed, organolithium compounds are preferred. The alkali metals include lithium, sodium, potassium, rubidium, and cesium.

The organoalkali metal compounds that are used as catalysts can be prepared in several ways, for example, by replacing halogens in an organic halide with alkali metals, by direct addition of alkali metals to a double bond, or by reacting an organic halide with a suitable alkali metal compound.

Suitable organoalkali metal initiators can be represented by the formula $RM_x$ wherein R is a hydrocarbon radical selected from the group consisting of aliphatic, cycloaliphatic, and aromatic radicals constaining from 1 to 20 carbon atoms, M is an alkali metal, and $x$ is an integer from 1 to 4. The preferred initiators are organolithium compounds wherein $x$ is 1 or 2. Organoalkali metal initiators are well known in the art. Examples of the organoalkali metal compounds that can be used as catalysts include:

methyllithium
n-butyllithium
tert-butyllithium
amylpotassium
isopropylcesium
n-decyllithium
phenyllithium
1-naphthallithium
1,4-dilithiobutane
1,5-dipotassiopentane
1,4-disodio-2-methylbutane
1,10-dilithiodecane
1,15-dipotassiopentadecane
1,20-dilithioeicosane
dilithionaphthalene
1,4-dilithiomethylnaphthalene
4,4'-dilithiobiphenyl
disodiophenanthrene
1,2-dilithio-1,1-diphenylethane
1,2-dipotassiotriphenylethane
1,4-dilithiocyclohexane
2,4-disodioethylcyclohexane
1,5,12-trilithiododecane
1,4,7-trisodioheptane
1,2,7,8-tetrasodionaphthalene
dilithiomethane
1,4-dilithio-1,1,4,4-tetraphenylbutane and the like.

The amount of initiator used depends upon the organoalkali metal compound and the type of polymer desired. The effective initiator level is normally in the range of about 0.25 to 20 millimoles per 100 grams of monomer(s) charged to the polymerization system. Organoalkali metal initiators vary greatly in their solubility and this has a considerable effect on the amount used. Compounds which are very soluble in hydrocarbon diluents, such as butyllithium, amyllithium, and the like, are used in relatively small amounts, i.e., amounts in the lower portion of the specified range. Those which possess limited solubility can be used in larger amounts, the least soluble compounds being used in the larger quantities. In any event the initiator level is generally adjusted, together with the amount of tin compound, to yield a polymer with an inherent viscosity in the range of 1 to 4.

It is preferred that the polymerization be conducted in the presence of a suitable diluent such as benzene, toluene, xylene, cyclohexane, methylcyclohexane, n-butane, n-hexane, n-heptane, isooctane, mixtures of these, and the like. Generally the diluent is selected from hydrocarbons, e.g., paraffins, cycloparaffins, and aromatics containing from 4 to 10 carbon atoms per molecule.

In some instances it may be desirable to utilize a polymerization process wherein branched polymers are produced and later terminated with the tin compound. Branching agents such as divinylbenzene and the like can be added to the polymerization recipe to produce the branched polymers that are useful in the process of my invention.

While the polymerization temperature can vary over a broad range, e.g., from —100 to 150° C., it is preferred to operate at a temperature in the range of —75 to 100° C. The period required for polymerization and for reaction of the tin compound with the polymer can range from about 5 minutes to 100 hours, although the time is ordinarily in the range of about 10 minutes to 25 hours.

Various materials are known to be destructive to organoalkali metal catalysts. These materials include carbon dioxide, oxygen, water, alcohols, mercaptans, and primary and secondary amines. It is highly desirable, therefore, that the monomers be freed of these materials as well as other materials which tend to inactivate the catalyst. Any of the well known means for removing such contaminants can be used. Also, it is preferred that the solvent mixture used in the process be substantially free of impurities such as water, oxygen, and the like. In this connection, it is desirable to remove air and moisture from the reaction vessel in which the polymerization is conducted. Any reactive impurities remaining in the reaction vessel or in the solvent mixture are removed by the organoalkali metal catalyst which serves as a scavenger.

At the conclusion of the polymerization reaction, the polymer is treated with a tin compound to shortstop the polymerization reaction. Various tin compounds can be used to shortstop the polymerization reaction. Generally the tin compound that is added to the polymerization mixture will have the formula $R_xSnZ_y$ wherein R is selected from the group consisting of saturated aliphatic, saturated cycloaliphatic, aromatic radicals, and combinations thereof, Z is selected from the group consisting of fluorine, chlorine, bromine, iodine,

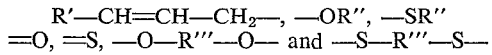

wherein R' is selected from the group consisting of hydrogen, saturated aliphatic, saturated cycloaliphatic and aromatic radicals and combinations thereof; R'' is selected from the group consisting of saturated aliphatic, saturated cycloaliphatic and aromatic radicals and combinations thereof; R''' is an alkylene radical with which the oxygen or sulfur and the tin atom forms a cyclic compound containing from 5 to 8 members in the ring and when Z is selected from the group fluorine, chlorine, bromine, iodine, R'—CH=CH—CH$_2$—, —OR'' and —SR'', $x$ is an integer from 0 to 2 and $y$ is an integer from 2 to 4 such that $x+y=4$, and when Z is =S, =O, —O—R'''—O— or —S—R'''—S—, $y$ is 1 and $x$ is 2. The number of carbon atoms in each of R, R' and R'' is in the range of 1 to 12. The number of carbon atoms in R''' is in the range of 2 to 12. R, R', and R'' can be the same or different. It has been found that by adding the treating agent of this invention to the polymerization mixture after the polymerization has been completed and prior to the inactivation of the catalyst, the rubbery product obtained is processed very easily on conventional masticating and compounding equipment as described hereinafter.

Examples of the tin compounds that can be utilized in this invention are:

stannic fluoride
stannic chloride
stannic bromide
stannic iodide
tetraallyltin
methyltrichlorotin
di-n-hexylidifluorotin
dodecyltriiodotin
dodecyltrichlorotin
dicylohexyldichlorotin
diphenyldibromotin
benzyltrichlorotin
4-tolyltrifluorotin
diethyldiallyltin
propyltriallyltin
diallyldichlorotin
dodecylallyldichlorotin
tetra(2-octenyl)tin
tetra(3-cyclopentyl)allyltin
dibutylemthoxytin
tetramethoxytin tibutylbis(octyloxy)tin
di(benzyloxy)diethyltin
tri(dodecoxy)cyclohexyltin
di(cyclopentoxy)diphenyltin
tetradodecoxytin
dichlorodiphenoxytin
tetramethylthiotin
di(dodecylthio)diphenyltin
tri(butylthio)cyclopentyltin
di(benzylthio)didodecyltin
tri(cyclohexylthio)nonyltin
tetradodecylthiotin
dimethyltin oxide
di(3-diphenyl)tin oxide
dibutyltin oxide
dicyclohexyltin oxide
didodecyltin oxide
butylphenyltin oxide
dimethyltin sulfide
dibutyltin sulfide
di-p-biphenylyltin sulfide
didodecyltin sulfide
di-1-naphthyltin sulfide
dicyclopentyltin sulfide
2,2-dibutyl-5-methyl-1,3-dioxa-2-stannacyclopentane
2,2-diethyl-1,3-dioxa-2-stannacyclohexane
2-ethyl-2-phenyl-5-butyl-1,3-dioxa-2-stannacyclohexane
2,2-di(4-tolyl)-1,3-dioxa-2-stannacycloheptane
2,2-dipropyl-1,3-dioxa-2-stannacyclooctane
2,2-dimethyl-1,3-dithia-2-stannacyclopentane
2,2-didodecyl-1,3-dithia-2-stannacyclohexane
2,2-diphenyl-4,5,6,7-tetramethyl-1,3-dithia-2-stannacycloheptane
2,2-dibutyl-4,4-dimethyl-1,3-dithia-2-stannacyclopentane Some of the above-mentioned tin compounds may exist in a polymeric form. When the tin compounds are in polymeric form, additional mechanical mixing steps known in the art may be required to insure intimate contact between the tin compound and the alkali metal terminated polymer.

Generally the amount of tin compound employed is in the range of 0.05 to 2 equivalents, based on the Z groups in the formula $R_xSnZ_y$, per gram atom of alkali metal in the initiator. The preferred range for the amount of tin compound to be added is from 0.5 to 2 equivalents, based on the Z groups in the formula $R_xSnZ_y$, per gram atom of alkali metal in the initiator. One equivalent of the reactive Z group per gram atom of alkali metal in the catalyst is most preferred.

It is to be understood that various other methods of making polymers of conjugated dienes are known in the art. When copolymers are used in my invention they can be either block or random copolymers. It is well known in the art that random copolymers can be produced by adding certain randomizing agents to solution polymerization systems, such as the one described above. One particularly desirable randomizing agent is tetrahydrofuran. It is to be understood that other well known randomizing agents can be used. Examples of suitable randomizing agents can be found in U.S. Patent 2,975,160, Zelinski, issued Mar. 14, 1961. Since the polymers that are used to make sponge rubber in accordance with my invention are subject to a blowing, it is important that the Mooney value of the copolymer not be so high as to prevent uniform blowing. I have found that the Mooney value of the copolymer, before blowing, must be less than 50, as determined by ASTM D-1646-61 (Mooney viscometer, large rotor, 212° F., 4 minutes). While I do not wish to be limited by any theory, it appears that the viscosity of the polymers terminated with the tin compound, as described above, decreases when they are heated or milled in the presence of an acidic compound. This decrease in viscosity means that pigment dispersion can be effected while the viscosity is relatively high, an acid such as stearic acid an be added, and the mixing of the sponge compound then effected at a low viscosity level. The resulting low viscosity permits easy expansion by the blowing agent. Thus it is seen that the polymers, terminated with a tin compound, eliminate the cost and time consumed in peptizing the rubber normally required in blown rubber sponge manufacture.

Various acidic compounds known in the art can be used in the mixing of the sponge compound to reduce the viscosity level of the polymer. Examples of suitable acidic compounds are halogens; metal halides such as silicon tetrachloride, silicon tetrabromide, and aluminum chloride; acidic salts such as aluminum sulfate, lead phosphate, bismuth orthophosphate; acid esters of inorganic acids such as methyl hydrogen sulfate, and ethyl acid orthophosphate; inorganic acids; organic acids; and mercaptans. It is understood that the foregoing are only a few examples of suitable acidic compounds. Any material that is capable of accepting electrons can be used, so long as it is not harmful to the polymer being treated.

The sponge rubber products of my invention can be made in accordance with any known process for expanding rubber. One suitable method is to incorporate a blowing agent into the polymer mixture, heat the mixture to form a fused rubber mass, thus activating the blowing agent and expanding the polymer. In such cases, the blowing agent decomposes the release gaseous products, thus causing the soft rubber to expand into a sponge-like mass.

Any suitable blowing agent can be used. Examples of suitable blowing agents include p,p'-oxybis(benzenesulfonyl hydrazide), diphenylsulfon-3,3'-disulfonyl hydrazide, benzene-1,3-disulfonyl hydrazide, benzenesulfonyl hydrazide, N,N'-dinitrosopentamethylenetetramine, N,N'-dimethyl-N,N'-dinitrosoterephthalamide, diazominobenzene, azobisisobutyronitrile, azobisformamide(azodicarbonamide), ammonium and sodium carbonates and bicarbonates, ammonium acetate, sodium nitrate, hydrogen peroxide, urea, hydrogenated rosin, low-boiling hydrocarbons such as n-pentane, and the like.

When using blowing agents that are activated by heat, is is important that the initial milling or compounding steps be carried out at a temperature that is low enough to prevent a premature blowing. I have found, that it is advantageous to carry out the milling or compounding step below a temperature of 230° F. At temperatures above 230° F., some of the above-identified blowing agents will be prematurely activated, resulting in premature blowing.

I have also found that polymers containing carbon-tin bonds can be blended with other types of rubbery polymers and used in preparing blown rubber sponges having superior properties. The polymers containing carbon-tin bonds can be compounded with up to 75 weight percent natural rubber, solution polymerized conjugated diene polymers that have been shortstopped by conventional methods, and emulsion type polymers. The blends of various other rubbers with the tin-terminated polymers described above have been found to possess better load bearing characteristics and better compression set characteristics than sponges produced by the prior art methods.

The blown rubber sponges produced in accordance with my invention have very high cure rates. This property is especially desirable in commercial operations where the time required for curing sponge compositions directly affects the production rates, cost of finished products, etc. In many instances, the cure rate for sponge compositions is much greater than the cure rate for sponges made from emulsion type polymers and various types of of natural rubber.

By making blown rubber sponges in accordance with this invention, large quantities of fillers, reinforcing agents, plasticizers, etc., can be incorporated into the sponge recipe. In many cases, the amount of fillers, reinforcing agents, plasticizers, etc., will be greater than the amount that can be incorporated in sponge recipes using prior art polymers. Since the presence of the above named materials adversely affects quality of the blown sponge it is highly desirable to develop sponge compositions that can be highly loaded with various materials such as clay, talc, carbon black, etc., without seriously degrading the properties of the finished product. The sponges made in accordance with my invention can include large quantities of such materials without serious change in the quality of the finished product. Thus, by using my invention, sponges having superior physical properties can be made using larger quantities of relatively inexpensive fillers than possible by previously known methods.

The blown sponges made in accordance with my invention can be used for any purpose wherein a durable cushioning material is required. I have found that the sponge compositions are particularly useful in the manufacture of carpet underlay pads. As stated above, the sponge recipes can include large amounts of fillers, reinforcing agents and plasticizers to produce inexpensive carpet underlay pads. The sponge composition of this invention are exceptionally well suited for conventional processes for making carpet underlay pads. Such conventional processes usually include calendering a thin sheet of the compounded sponge recipe onto a coarse wire mesh, horizontal, endless belt. The endless belt passes through a heated oven where the thin sheet of sponge recipe is heated. As the thin sheet is heated, it sags and drapes down into the spaces between the wire mesh. This gives the sheet a "waffle-like" appearance. During the heating step the blowing agents in the sponge recipe are activated and bubbles appear in the sheet. The heating also cures the sponge.

The sponge recipes of my invention flow more readily than conventional sponge recipes. This allows the carpet underlay pad to be formed into its "waffle-like" appearance much more rapidly. This increased ability to flow or drape coupled with higher rate of cure allows the sponge rubber carpet underlay pads of my invention to be formed much faster and more economically than pads made using prior art recipes.

The following examples are included to illustrate preferred embodiments of my invention. Material included in the examples should not be interpreted as unduly limiting the scope of the invention as hereinbefore described.

In all of the examples, the determinations of physical properties were as follows:

Mooney viscosity (ML-4) was determined by the procedure of ASTM D1646-61 (Mooney viscometer, large rotor, 212° F., 4 minutes).

Blow percent was determined by subtracting the final density from the original density, dividing the resulting value by the original density and multiplying by 100.

Load for 50% deflection, compression set and oil swell were determined by the procedure of ASTM D1056-59T.

EXAMPLE I

Three different types of butadiene-styrene copolymers were prepared. For identification purposes, the polymers are referred to as Polymer A, Polymer B and Polymer C. Polymer A was a solution polymerized, stannic chloride terminated, random copolymer. It was prepared using the following recipe and conditions:

|  | Parts by weight |
| --- | --- |
| Butadiene | 75 |
| Styrene | 25 |
| n-Hexane | 700 |
| Tetrahydrofuran | 1.5 |
| n-Butyllithium | 0.106 |
| Initiation temperature, °F. | 120 |
| Peak temperature, °F. | 205 |
| Time to peak temperature, hour | 0.5 |
| Pressure, p.s.i.g. | 50 |

At the end of the reaction period the polymer was shortstopped by the addition of 0.08 phm. (part per 100 parts of monomers) of stannic chloride, and 1 phm. of 2,6-di-tert-butyl-4-methylphenol was added as antioxidant. The polymer was steam stripped and extruder dried.

Polymer B was a solution polymerized, random butadiene-styrene copolymer that was terminated with a mixture of saturated and unsaturated fatty acids. Polymer B was prepared using the following recipe and conditions:

|  | Parts by weight |
| --- | --- |
| Butadiene | 75 |
| Styrene | 25 |
| n-Hexane | 700 |
| Tetrahydrofuran | 1.5 |
| n-Butyllithium | 0.175 |
| Divinylbenzene | 0.2 |
| Initial temperature, °F. | 120 |
| Peak temperature, °F. | 205 |
| Time to peak temperature, hour | 0.5 |
| Pressure, p.s.i.g. | 50 |

At the end of the reaction period the polymer was shortstopped by addition of 1 phm. (part per 100 parts of monomer) of a mixture of $C_{16}$–$C_{18}$ saturated and unsaturated fatty acids, and 1 phm. of 2,6-di-tert-butyl-4-methylphenol was added as antioxidant. The polymer was steam stripped and extruder dried.

Polymer C was an SBR 1506 butadiene-styrene rubber polymerized in an aqueous emulsion. The polymer was prepared using the recipe and conditions described in ASTM D1419-61T.

Polymer A, Polymer B, and Polymer C were then evaluated in the following rug underlay recipe:

|  | Parts by weight |
| --- | --- |
| Polymer | 100 |
| Plastogen [1] | 2 |
| Circo light process oil [2] | 60 |
| CCO white [3] | 130 |
| Dixie clay [4] | 65 |
| Sodium carbonate | 15 |
| Stearic acid | 12 |
| Celogen OT [5] | 1.5 |
| Sulfur | 4 |
| Zinc oxide | 4 |
| Methyl tuads [6] | 1 |
| Altax [7] | 2 |

[1] A mixture of an oil-soluble, high molecular weight sulfonic acid with a paraffinic oil.
[2] An odorless, light gold colored oil having a specific gravity of about 0.92 and a viscosity of about 155 SUS at 100° F.
[3] Calcium carbonate (natural, water-ground).
[4] A hard-type, white-to-cream colored kaolin mineral filler.
[5] p,p'-Oxybis(Benzenesulfonyl hydrazine).
[6] Tetramethyl thiuram disulfide.
[7] 2,2'-dibenzothiazyl disulfide.

Viscosity of the polymers and the compounded polymers, and physical properties of the cured materials are shown below.

TABLE I

| Polymer | A | B | C |
| --- | --- | --- | --- |
| ML-4, 212° F.: |  |  |  |
| Polymer | 32 | 25 | 27 |
| Compounded polymer | 2.7 | 2.0 | 4.3 |
| Physical properties (cured 10 min. at 330° F.): |  |  |  |
| Density, g./cc. | 0.59 | 0.59 | 0.60 |
| Blow, percent | 59.0 | 58.5 | 58.4 |
| Load at 50% deflection (80° F.), lb./in.² | 65.3 | 41.3 | 38.2 |
| Compression set (50% deflection), percent | 37.8 | 49.8 | 71.9 |
| Oil swell, percent change in volume | 40.2 | 63.9 | 58.5 |

These data show that the blown sponge made from the stannic chloride terminated polymer (Polymer A) supported a 58% greater load than polymer B at 50% deflection. The blown sponge made from the stannic chloride-terminated polymer also had less compression set and oil swell than that of either the solution-polymerized copolymer or the emulsion-polymerized copolymer, and thus is greatly superior to these latter two polymers.

EXAMPLE II

A polymer similar to Polymer A of Example I was compared with another portion of Polymer C in the following automotive sponge recipe:

| | Parts by weight |
|---|---|
| Polymer | 100 |
| Thermax black [1] | 55 |
| Sterling V black [2] | 15 |
| CCO white [3] | 40 |
| Circo light process oil [3] | 55 |
| Sodium bicarbonate | 15 |
| Zinc oxide | 4.5 |
| Stearic acid | 5 |
| Petrolatum | 2 |
| Sulfur | 2.5 |
| Altax [3] | 2 |
| DOTG [4] | 0.25 |
| Retarder W [5] | 0.75 |

[1] A medium thermal carbon black.
[2] A general purpose furnace black.
[3] As in Example I.
[4] Di-ortho-tolylguanidine.
[5] Salicylic acid with a dispersing agent.

Viscosity of the polymers and the compounded polymers, and physical properties of the cured materials are shown below:

TABLE II

| Polymer | A | C |
|---|---|---|
| ML-4, 212° F.: | | |
| Polymer | 28 | 27 |
| Compounded polymer | 4.5 | 5.5 |
| Physical properties (cured 20 min. at 315° F.): | | |
| Density, g./cc. | 0.47 | 0.48 |
| Blow, percent | 62.1 | 61.3 |
| Load at 50% deflection (80° F.), lb./in.$^2$ | 16.5 | 14.6 |
| Compression set (50% deflection), percent | 12.7 | 20.5 |
| Oil swell, percent change in volume | 86.4 | 106.0 |

As in Example I, these data show that blown sponge made from the stannic chloride-terminated polymer (Polymer A) supported a 13 percent greater load than polymer C at 50 percent deflection, and reduced the compression set by 38 percent and reduced the oil swell by 18.5 percent compared to the emulsion-polymerized copolymer.

EXAMPLE III

Three polymers were prepared for evaluation in a rug underlay recipe. Polymer D was similar to Polymer A of Example I, and was prepared using the following recipe and conditions:

| | Parts by weight |
|---|---|
| Butadiene | 75 |
| Styrene | 25 |
| n-Hexane | 800 |
| Tetrahydrofuran | 1.5 |
| n-Butyllithium | 0.155 |
| Divinylbenzene | 0.04 |
| Initiation temperature, °F. | 118 |
| Peak temperature, °F. | 206 |
| Reaction time, minutes | 53 |
| Reactor pressure, p.s.i.g. | 50 |

At the end of the reaction period the polymer was shortstopped by the addition of 0.08 phm. (part per 100 parts of monomers) of stannic chloride, and 1 phm. of 2,6-di-tert-butyl-4-methylphenol was added as antioxidant. The polymer was steam stripped and extruder dried.

Polymer E was prepared using the following recipe and conditions:

| | Parts by weight |
|---|---|
| Butadiene | 75 |
| Styrene | 25 |
| n-Hexane | 800 |
| Tetrahydrofuran | 1.5 |
| n-Butyllithium | 0.141 |
| Initiation temperature, ° F. | 121 |
| Peak temperature, ° F. | 207 |
| Reaction time, minutes | 43 |
| Reactor presure, p.s.i.g. | 50 |

At the end of the reaction period the polymer was shortstopped by the addition of 0.08 phm. (part per 100 parts of monomers) of stannic chloride, and 1 phm. of 2,6-di-tert-butyl-4-methylphenol was added as antioxidant. The polymer was steam stripped and extruder dried.

Polymer F was prepared in the same manner as Polymer C of Example I.

The above-described copolymers were then compounded according to the following recipe:

| Run | 1 | 2 | 3 | 4 | 5 |
|---|---|---|---|---|---|
| Polymer D | 50 | 50 | 100 | | |
| Polymer E | 50 | | | 100 | |
| Polymer F | | 50 | | | 100 |
| Plastogen [1] | 2 | 2 | 2 | 2 | 2 |
| Circo light process oil [1] | 60 | 60 | 60 | 60 | 60 |
| CCO white [1] | 130 | 130 | 130 | 130 | 130 |
| Dixie clay [1] | 65 | 65 | 65 | 65 | 65 |
| Sodium bicarbonate | 15 | 15 | 15 | 15 | 15 |
| Stearic acid | 12 | 12 | 12 | 12 | 12 |
| Celogen OT [1] | 1.5 | 1.5 | 1.5 | 1.5 | 1.5 |
| Sulfur | 4 | 4 | 4 | 4 | 4 |
| Zinc oxide | 4 | 4 | 4 | 4 | 4 |
| Methyl tuads [1] | 1 | 1 | 1 | 1 | 1 |
| Altax [1] | 2 | 2 | 2 | 2 | 2 |

[1] As described in Example I.

Processing data and physical properties of the cured rubber sponge are shown below:

TABLE III

| | 1 | 2 | 3 | 4 | 5 |
|---|---|---|---|---|---|
| Processing data: Compounded ML-4 at 212° F | 5.5 | 4.0 | 4.0 | 6.5 | 4.0 |
| Physical properties (cured 10 min. at 330° F.): | | | | | |
| Density, g./cc. | 0.63 | 0.66 | 0.61 | 0.62 | 0.65 |
| Blow, percent | 56.3 | 54.2 | 57.6 | 56.9 | 54.9 |
| Load at 50% deflection (80° F.), lb./in.$^2$ | 48.2 | 44.3 | 41.7 | 43.2 | 39.5 |
| Compression set, percent | 41.0 | 45.6 | 42.3 | 38.7 | 45.1 |

These data show that the copolymers D and E terminated with tin compound produce sponges that have superior physical properties to those produced from the emusion-polymerized copolymer F. It is noted that in Run 2 when the emulsion-polymerized copolymer was compounded with the tin chloride-terminated solution copolymer, the resulting sponge supported a significantly greater load, about 12 percent, for 50% deflection when compared with the sponge made from the emulsion-polymerized copolymer alone.

Further and even more surprising is the fact that the blends of D and F (Run 2) supported a load of 44.3, which is greater than either D alone, Run 3 (41.7) or F alone, Run 5 (39.5). Also, a blend of D and E, Run 1, supported a load of 48.2, which is greater than D alone, Run 3 (41.7) or E alone, Run 4, (43.2).

EXAMPLE IV

A series of runs was made to evaluate a tin chloride terminated, solution-polymerized random copolymer of butadiene and an emulsion polymerized butadiene-styrene polymer in a sponge rug underlay recipe. The tin chloride terminated polymer is referred to as Polymer D and was prepared using the same recipe and conditions as shown in Example III for the preparation of Polymer D.

The emulsion polymerized butadiene-styrene rubber is identified as Polymer G and was prepared in the same manner as Polymer C of Example I.

Polymers D and G were compounded, utilizing the following recipe:

|  | 1 | 2 |
|---|---|---|
| Polymer D | 100 |  |
| Polymer G |  | 100 |
| Plastogen [1] | 2 | 2 |
| Circo light process oil [1] | 65 | 65 |
| CCO white [1] | 115 | 115 |
| Dixie clay [1] | 115 | 115 |
| Sodium bicarbonate | 15 | 15 |
| Stearic acid | 12 | 12 |
| Sulfur | 4.5 | 4.5 |
| Zinc oxide | 4 | 4 |
| Methyl tuads [1] | 1 | 1 |
| Altax [1] | 2 | 2 |

[1] As described in Example I.

Processing data and physical properties of the cured rubber sponge are shown below:

TABLE IV

|  | 1 | 2 |
|---|---|---|
| Processing data: Compounded ML-4 at 212° F | 2.0 | 3.0 |
| Physical property data (cured 10 min. at 330° F.): |  |  |
| Density | 0.62 | 0.60 |
| Blow, percent | 56.9 | 58.3 |
| Load required for 50% deflection, lb./in.$^2$ | 49.2 | 40.0 |
| Compression set, percent | 42.2 | 59.0 |

These data show that the sponge produced from the tin chloride-terminated solution copolymer (Polymer D) had much better load bearing characteristics and compression set characteristics than the sponge made from the emulsion-polymerized copolymer (23% greater load at 50% deflection).

EXAMPLE V

A series of runs was made to evaluate blown sponge compositions made from solution-polymerized copolymers of butadiene and styrene. Three different types of copolymers were used. Polymer D was a tin chloride shortstopped copolymer. It was prepared using the same recipe and conditions as shown in Example III for Polymer D. Polymer H was a radial type copolymer of butadiene and styrene and was prepared using the following recipe and conditions:

|  | Parts by weight |
|---|---|
| Butadiene (charged after 30 minutes) | 57 |
| Styrene (charged first) | 43 |
| Cyclohexane | 860 |
| n-Butyllithium | 0.18 |
| Reactor pressure, p.s.i.g. | 50 |
| Styrene reaction: |  |
| Initiation temperature, ° F. | 122 |
| Peak temperature, ° F. | 140 |
| Time, minutes | 30 |
| Butadiene reaction: |  |
| Initiation temperature, ° F. | 137 |
| Peak temperature, ° F. | 168 |
| Time, minutes | 20 |

As indicated, the styrene was charged first and allowed to react for 30 minutes, and the butadiene was then charged. At the end of the total reaction period the polymer was shortstopped with 0.1 phm. (part per 100 parts of monomers) of liquid epoxidized butadiene containing 9 percent oxirane oxygen, and 1 phm. of 2,6-di-tert-butyl-4-methylphenol was added as antioxidant. The polymer was steam stripped and extruder dried. It was then masterbatched with 37.5 phr. (parts per 100 parts of rubber) of an ASTM type 4 oil having a specific gravity of 0.8973 and a viscosity of 503 SUS at 100° F.

Polymer I was a random copolymer of butadiene and styrene and was prepared using the following recipe and conditions:

|  | Parts by weight |
|---|---|
| Butadiene | 57 |
| Styrene | 43 |
| n-Hexane | 800 |
| Tetrahydrofuran | 3.0 |
| n-Butyllithium | 0.14 |
| Divinylbenzene | 0.3 |
| Initiation temperature, ° F. | 125 |
| Peak temperature, ° F. | 142 |
| Reaction time, minutes | 66 |
| Reactor pressure, p.s.i.g. | 50 |

At the end of the reaction period the polymer was shortstopped by addition of 1 phm. (part per 100 parts of monomers) of a mixture of $C_{16}$–$C_{18}$ saturated and unsaturated fatty acids, and 1 phm. of 2,6-di-tert-butyl-4-methylphenol was added as antioxidant. The polymer was steam stripped and extruder dried.

Polymer J was a block copolymer of butadiene and styrene. It was prepared using the following recipe and conditions:

|  | Parts by weight |
|---|---|
| Butadiene | 71.4 |
| Styrene | 28.6 |
| n-Hexane | 800 |
| n-Butyllithium | 0.215 |
| Divinylbenzene | 0.3 |
| Initiation temperature, ° F. | 130 |
| Peak temperature, ° F. | 152 |
| Reaction time, hours | 3 |
| Reactor pressure, p.s.i.g. | 50 |

At the end of the reaction period the polymer was shortstopped by addition of 1 phm. (part per 100 parts of monomers) of a mixture of $C_{16}$–$C_{18}$ saturated and unsaturated fatty acids, and 1 phm. of 2,6-di-tert-butyl-4-methylphenol was added as antioxidant. The polymer was steam stripped and extruder dried.

The above-described copolymers were then compounded according to the following recipe:

|  | 1 | 2 | 3 | 4 |
|---|---|---|---|---|
| Polymer D | 80 | 80 | 80 | 100 |
| Polymer H | [3] 20 |  |  |  |
| Polymer I |  | 20 |  |  |
| Polymer J |  |  | 20 |  |
| Thermax Black [1] | 55 | 55 | 55 | 55 |
| Sterling V Black [1] | 15 | 15 | 15 | 15 |
| CCO White [2] | 40 | 40 | 40 | 40 |
| Circo Light Process Oil [2] | 55 | 55 | 55 | 55 |
| Sodium Bicarbonate | 15 | 15 | 15 | 15 |
| Zinc Oxide | 4.5 | 4.5 | 4.5 | 4.5 |
| Stearic Acid | 5 | 5 | 5 | 5 |
| Petrolatum | 2 | 2 | 2 | 2 |
| Sulfur | 2.5 | 2.5 | 2.5 | 2.5 |
| Altax [2] | 2 | 2 | 2 | 2 |
| DOTG [1] | 0.25 | 0.25 | 0.25 | 0.25 |
| Retarder W [1] | 0.75 | 0.75 | 0.75 | 0.75 |

[1] As described in Example II.
[2] As described in Example I.
[3] Including 5.5 parts of oil.

Viscosity data and physical properties of the cured sponge rubber are shown below:

TABLE V

|  | 1 | 2 | 3 | 4 |
|---|---|---|---|---|
| Processing data: Compounded ML-4 at 212° F | 3.5 | 5.5 | 5.5 | 5.5 |
| Physical properties (cured 20 min. at 315° F.): |  |  |  |  |
| Density | 0.450 | 0.442 | 0.474 | 0.467 |
| Blow, percent | 63.7 | 64.5 | 61.8 | 62.3 |
| Load at 50% deflection (80° F.), lb./in.$^2$ | 14.0 | 12.2 | 14.8 | 16.9 |
| Compression set, percent | 18.3 | 13.0 | 9.7 | 10.2 |

These data show that blown sponge compositions having improved properties can be made from solution-polymerized butadiene styrene copolymers that have been shortstopped with tin chloride. The data also show that blown sponge compositions having desirable properties can be made by blending tin chloride-terminated copolymers with various other types of rubbery polymers.

EXAMPLE VI

A series of runs was made to evaluate a blend of a tin chloride terminated solution copolymer of butadiene and styrene with natural rubber in a recipe for making sponge rubber. The tin chloride terminated copolymer is referred to as Polymer D. It was prepared using the same recipe and conditions as shown in Example III for Polymer D. The natural rubber was No. 1 smoked sheet. It was pre-masticated to a Mooney viscosity of 40.5 (ML-4 at 212° F.). The following recipe was used to evaluate the various blends:

|  | 1 | 2 | 3 |
|---|---|---|---|
| Polymer D | 50 | 75 | 100 |
| Natural rubber | 50 | 25 |  |
| Plastogen [1] | 2 | 2 | 2 |
| Circo light process oil [1] | 60 | 60 | 60 |
| CCO white [1] | 130 | 130 | 130 |
| Dixie clay [1] | 65 | 65 | 65 |
| Sodium bicarbonate | 15 | 15 | 15 |
| Stearic acid | 12 | 12 | 12 |
| Celogen OT [1] | 1.5 | 1.5 | 1.5 |
| Sulfur | 4 | 4 | 4 |
| Zinc oxide | 4 | 4 | 4 |
| Methyl tuads [1] | 1 | 1 | 1 |
| Altax [1] | 2 | 2 | 2 |

[1] As described in Example I.

Viscosity of the compounded polymers and physical properties of the cured rubber sponge are shown below:

TABLE VI

|  | 1 | 2 | 3 |
|---|---|---|---|
| Processing data: Compounded ML-4 at 212° F | 4.0 | 4.0 | 4.0 |
| Physical properties (cured 10 min. at 330° F.): |  |  |  |
| Density, g./cc. | 0.60 | 0.55 | 0.61 |
| Blow, percent | 58.3 | 59.7 | 57.6 |
| Load at 50% deflection, lb./in.² (80° F.) | 44.6 | 43.9 | 41.7 |
| Compression set, percent | 36.3 | 38.4 | 42.3 |

These data show that blown sponge compositions can be prepared utilizing blends of natural rubber and tin chloride-terminated solution-polymerized copolymers of butadiene and styrene. The resulting blown sponge compositions have desirable physical properties.

EXAMPLE VII

A series of runs was made to compare the flow or drape characteristics of sponge stocks containing tin chloride terminated copolymer of butadiene and styrene with the flow characteristics of sponge stocks made with an emulsion type copolymer of butadiene and styrene and with natural rubber. The tin chloride terminated copolymer is referred to as Polymer D. It was prepared using the same recipe and conditions as shown in Example III for Polymer D. The emulsion type copolymer is referred to as Polymer C. It was prepared using the same recipe and conditions as shown in Example I for Polymer C. The natural rubber was No. 1 smoked sheet. It was pre-masticated with 0.75 part by weight of a xylenethiol peptizer per 100 parts by weight of rubber, to a Mooney viscosity of 20 (ML-4 at 212° F.). The following recipe was used to evaluate the flow characteristics of the polymers:

|  | 1 | 2 | 3 |
|---|---|---|---|
| Polymer D | 100 |  |  |
| Polymer C |  | 100 |  |
| Natural rubber |  |  | 100 |
| CCO white [1] | 165 | 165 | 130 |
| Dixie clay [1] | 30 | 30 | 65 |
| Zinc oxide | 4 | 4 | 4 |
| Stearic acid | 6 | 12 | 12 |
| Circo light process oil [1] | 60 | 60 | 60 |
| Plastogen |  | 2 | 2 |
| MBTS [2] | 2.5 | 2.5 | 2.5 |
| Methyl Zimate [3] | 1.5 | 1 | 1 |
| Sulfur | 4 | 4 | 4 |
| Sodium bicarbonate | 15 | 15 | 15 |
| Celogen OT [1] | 1.5 | 1.5 | 1.5 |

[1] As described in Example I.
[2] 2,2'-dibenzylthiazyl disulfide.
[3] Zinc dimethyldithiocarbamate.

All of the compounded sponge stocks had a compounded Mooney viscosity of 6 (ML-4 at 212° F.).

Flow characteristics (drape time) on the compounded stocks were measured by sheeting out the stock on a smooth surface to a thickness of 0.057 inch. A one-inch square piece of the stock was then placed over the mouth of a 100 ml. graduated cylinder that had previously been heated to 340° F. in an air oven. The amount of sag or drape is measured from the top of the cylinder to the bottom of the stock. Measurements were recorded by visual inspection. Flow characteristics (drape time) are shown below. Values are reported as distance from the top of the cylinder to the bottom of the stock at one minute intervals:

|  | 1 min. | 2 min. | 3 min. | 4 min. | 5 min. |
|---|---|---|---|---|---|
| Run 1 | 0.18 | 0.36 | 0.50 |  |  |
| Run 2 | 0.15 | 0.29 | 0.43 | 0.50 |  |
| Run 3 | 0.15 | 0.26 | 0.38 | 0.45 | 0.49 |

These data show that the sponge stock containing the tin chloride terminated copolymer (Run 1) had much better flow characteristics than the stocks containing emulsion type polymers and natural rubber. To obtain a drape of 0.5 inch, 33 percent more time was required for the stock containing emulsion type polymer; 66 percent more time was required for the same amount of drape when the stock contained natural rubber.

As will be evident to those skilled in the art, many variations and modifications of the invention can be practiced in view of the foregoing disclosure. Such variations and modifications are believed to come within the spirit and scope of the invention.

I claim:

1. A blown sponge comprising a blown conjugated diene polymer, said polymer, which contains carbon-tin bonds, having been formed by contacting a conjugated diene monomer with an organoalkali metal initiator and shortstopped with a tin compound having the formula $R_xSnZ_y$ wherein R is selected from the group consisting of saturated aliphatic, saturated cycloaliphatic and aromatic radicals, Z is selected from the group consisting of fluorine, chlorine, bromine, iodine, $$R'\text{---}CH=CH\text{---}CH_2\text{---}$$

—OR", —SR", =S, =O, —O—R"'—O— and

wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R"' is an alkylene radical with which oxygen and sulfur form a cyclic compound with the tin atom, said cyclic compound containing from 5 to 8 members in the ring, the number of carbon atoms in each R, R' and R" being in the range of 1 to 12, the number of carbon atoms in R"' being in the range of 2 to 12, when Z is selected from the group consisting of fluorine, chlorine, bromine, iodine, $R'\text{---}CH=CH\text{---}CH_2\text{---}$,

—OR"

and —SR", $x$ is an integer from 0 to 2 and $y$ is an integer such that $x+y=4$, and when Z is selected from the group consisting of =S, —O, —O—R"'—O— and

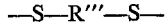

$y$ is 1 and $x$ is 2.

2. A blown sponge according to claim 1 wherein said polymer is a block copolymer.

3. A blown sponge according to claim 1 wherein said polymer is a random copolymer.

4. A blown sponge according to claim 2 wherein said copolymer is a copolymer of butadiene and styrene.

5. A blown sponge according to claim 3 wherein said copolymer is a copolymer of butadiene and styrene.

6. A blown sponge comprising a blown blend of a organoalkali metal catalyzed conjugated diene copolymer and a rubbery polymer, said copolymer, which contains carbon-tin bonds, having been shortstopped with a tin containing compound having the formula $R_xSnZ_y$ wherein R is selected from the group consisting of saturated aliphatic, saturated cycloaliphatic and aromatic radicals, Z is selected from the group consisting of fluorine, chlorine, bromine, iodine, R'—CH=CH—CH₂—, —OR", —SR", =S, =O, —O—R'''—O— and —S—R'''—S—, wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the ring, the number of carbon atoms in each of R, R' and R" being in the range of 1 to 12, the number of carbon atoms in R''' being in the range of 2 to 12 when Z is selected from the group consisting of fluorine, chlorine, bromine, iodine, R'—CH=CH—CH₂—, —OR", and —SR", x is an integer from 0 to 2 and y is an integer such that x+y=4, and when Z is selected from the group consisting of =S, —O—, —O—R'''—O— and

—S—R'''—S— y is 1 and x is 2.

7. A blown sponge according to claim 6 wherein said solution polymerized conjugated diene copolymer is a copolymer of butadiene and styrene and said rubber polymer is an emulsion polymerized copolymer of butadiene and styrene.

8. A blown sponge according to claim 6 wherein said solution polymerized conjugated diene copolymer is a copolymer of butadiene and styrene and said rubber polymer is a branched copolymer of butadiene and styrene.

9. A blown sponge according to claim 6 wherein said solution polymerized conjugated diene polymer is a copolymer of butadiene and styrene and said rubbery polymer is natural rubber.

10. A process for producing a rubber sponge having improved properties which comprises compounding a mixture of a organoalkali metal catalyzed copolymer of a conjugated diene having a Mooney value before blowing of less than 50 as determined by ASTM D1646-61 with a blowing agent in the presence of an acidic compound, said copolymer, which contains carbon-tin bonds, having been shortstopped with a tin containing compound having the formula R$_x$SnZ$_y$ wherein R is selected from the group consisting of saturated aliphatic, saturated cycloaliphatic and aromatic radicals, Z is selected from the group consisting of fluorine, chlorine, bromine, iodine,

R'—CH=CH—CH₂—

—OR", —SR", =S, =O, —O—R'''—O— and

—S—R'''—S—, wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the ring, the number of carbon atoms in each of R, R' and R" being in the range of 1 to 12, the number of carbon atoms in R''' being in the range of 2 to 12, when Z is selected from the group consisting of fluorine, chlorine, bromine, iodine,

R'—CH=CH—CH₂—

—OR", and —SR", x is an integer from 0 to 2 and y is an integer such that x+y=4, and when Z is selected from the group consisting of =S, —O, —O—R'''—O— and —S—R'''—S—, y is 1 and x is 2, and heating said mixture to decompose said blowing agent.

11. A process for producing a rubber sponge having improved properties which comprises compounding a mixture of (1) a organoalkali metal catalyzed copolymer of a conjugated diene and a vinyl substituted aromatic compound, said copolymer, which contains carbon-tin bonds, having been shortstopped with a tin containing compound having the formula R$_x$SnZ$_y$ wherein R is selected from the group consisting of saturated aliphatic, saturated cycloaliphatic and aromatic radicals, Z is selected from the group consisting of fluorine, chlorine, bromine, iodine, R'—CH=CH—CH₂—, —OR", —SR", =S, =O,

—O—R'''—O— and —S—R'''—S—, wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the ring, the number of carbon atoms in each of R, R' and R" being in the range of 1 to 12, the number of carbon atoms in R''' being in the range of 2 to 12, when Z is selected from the group consisting of fluorine, chlorine, bromine, iodine,

R'—CH=CH—CH₂—

—OR", and —SR", x is an integer from 0 to 2 and y is an integer such that x+y=4, and when Z is selected from the group consisting of =S, —O, —O—R'''—O— and —S—R'''—S—, y is 1 and x is 2, (2) a rubbery polymer and (3) a blowing agent in the presence of an acidic compound, and heating said mixture to decompose said blowing agent.

12. A process of claim 10 wherein the blowing agent is p,p'-oxybis(benzenesulfonylhydrazine).

13. A process of claim 11 wherein the blowing agent is p,p'-oxybis(benzenesulfonyl hydrazine).

14. A process for producing a carpet underlay comprising blending an organoalkali metal catalyzed polymer of a conjugated diene containing carbon-tin bonds which has been shortstopped with a tin containing compound having the formula R$_x$SnZ$_y$ wherein R is selected from the group consisting of saturated aliphatic, saturated cycloaliphatic and aromatic radicals, Z is selected from the group consisting of fluorine, chlorine, bromine, iodine, R'—CH=CH—CH₂—, —OR", —SR", =S, =O,

—O—R'''—O— and —S—R'''—S—, wherein R' is selected from the group consisting of hydrogen, saturated aliphatic, saturated cycloaliphatic and aromatic radicals, R" is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the ring, the number of carbon atoms in each of R, R' and R" being in the range of 1 to 12, the number of carbon atoms in R''' being in the range of 2 to 12, when Z is selected from the group consisting of fluorine, chlorine, bromine, iodine,

R'—CH=CH—CH₂—

—OR", and —SR", x is an integer from 0 to 2 and y is an integer such that x+y=4, and when Z is selected from the group consisting of =S, —O, —O—R'''—O— and —S—R'''—S—, y is 1 and x is 2, and has a Mooney value before blowing of less than 50 as determined by ASTM D1646-61 with a blowing agent in the presence of an acidic compound; forming the resultant blend into a sheet onto a support having open spaces; and heating said sheet to produce a carpet underlay.

References Cited

UNITED STATES PATENTS 2,764,599   9/1956   Clifford et al. _____ 260—2.5
2,798,055   7/1957   Sullivan _____ 260—2.5

MURRAY TILLMAN, *Primary Examiner.*

J. C. BLEUTGE, *Assistant Examiner.*

UNITED STATES PATENT OFFICE
CERTIFICATE OF CORRECTION

Patent No. 3,414,528

December 3, 1968

Warren S. Hall

It is certified that error appears in the above identified patent and that said Letters Patent are hereby corrected as shown below:

Column 14, line 37, in the formula, line 2 thereof, "$R''$", last occurrence, should read -- $R'''$ --.

Signed and sealed this 17th day of March 1970.

(SEAL)
Attest:

Edward M. Fletcher, Jr.
Attesting Officer

WILLIAM E. SCHUYLER, JR.
Commissioner of Patents